United States Patent
Maekawa et al.

(10) Patent No.: US 6,624,268 B1
(45) Date of Patent: Sep. 23, 2003

(54) AQUEOUS DISPERSION FOR WATER-AND-OIL REPELLANT AND PROCESS FOR PRODUCING THE SAME

(75) Inventors: Takashige Maekawa, Kanagawa (JP); Kazuya Oharu, Kanagawa (JP); Shuichiro Sugimoto, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 09/868,629

(22) PCT Filed: Oct. 26, 2000

(86) PCT No.: PCT/JP00/07517

§ 371 (c)(1),
(2), (4) Date: Jun. 26, 2001

(87) PCT Pub. No.: WO01/32800

PCT Pub. Date: May 10, 2001

(30) Foreign Application Priority Data

Oct. 29, 1999 (JP) .............................. 11-309562

(51) Int. Cl.$^7$ ..................... C08F 20/24; C08F 120/24; C08F 220/24; C09K 3/18; D06M 15/277
(52) U.S. Cl. ..................... 526/245; 524/805; 526/219.5; 526/243; 526/246
(58) Field of Search .............................. 526/219.5, 245, 526/243, 246; 524/805; 516/67, 76

(56) References Cited

U.S. PATENT DOCUMENTS

| | | | | |
|---|---|---|---|---|
| 3,277,039 A | * | 10/1966 | Marascia et al. ........... 524/805 |
| 5,330,681 A | * | 7/1994 | Brunetta et al. ........... 516/67 X |
| 5,344,903 A | * | 9/1994 | Raiford et al. ............... 526/245 |
| 5,688,309 A | | 11/1997 | Shimada et al. ................ 106/2 |
| 5,883,175 A | * | 3/1999 | Kubo et al. ............. 526/245 X |
| 6,177,531 B1 | | 1/2001 | Shimada et al. ............. 526/245 |
| 6,207,777 B1 | | 3/2001 | Shimada et al. ............. 526/245 |
| 6,251,984 B1 | | 6/2001 | Shimada et al. ............. 524/507 |
| 6,271,283 B1 | | 8/2001 | Shimada et al. ............. 523/122 |
| 6,376,592 B1 | | 4/2002 | Shimada et al. ............. 524/457 |

FOREIGN PATENT DOCUMENTS

| | | | |
|---|---|---|---|
| EP | 0 693 504 | | 1/1996 |
| EP | 0909802 | * | 4/1999 |
| JP | 60-40182 | * | 3/1985 |
| JP | 6-17034 | * | 1/1994 |
| JP | 9-59602 | * | 3/1997 |
| JP | 9-118877 | * | 5/1997 |
| JP | 9-125051 | * | 5/1997 |

* cited by examiner

*Primary Examiner*—Richard D. Lovering
(74) *Attorney, Agent, or Firm*—Oblon, Spivak, McClelland, Maier & Neustadt, P.C.

(57) ABSTRACT

A water and oil repellent aqueous dispersion is provided which is excellent in water and oil repellency and waterdrop rolling property and has dispersion stability even in the presence of co-agents and contaminants in the treatment bath. A preparative process comprises emulsifying a stock composition containing a polymerizable monomer containing a (meth)acrylate having perfluoroalkyl group as an essential component, a non-fluorine type surfactant containing no aromatic group, water and a solvent having a viscosity of at least 3 cP at 25° C. under pressure and polymerizing the stock composition.

20 Claims, No Drawings

AQUEOUS DISPERSION FOR WATER-AND-OIL REPELLANT AND PROCESS FOR PRODUCING THE SAME

This application is a 371 of PCT/JP00/07517 filed Oct. 26, 2000 which claims priority based on Japan 11-309562 filed Oct. 29, 1999.

TECHNICAL FIELD

The present invention relates to a water and oil repellent aqueous dispersion.

BACKGROUND ART

As a technique for imparting water and oil repellency to the surface of a textile, application of a polymer (X) having polymer units derived from a polymerizable monomer having a polyfluoroalkyl group (herein after referred to as a $R^f$ group) in the form of an aqueous dispersion in an aqueous solvent, an organic solution in an organic solvent or a solvent-type dispersion in an organic solvent has been known so far. Especially, application in the form of an aqueous dispersion is recommended in recent years in view of the problem with the working environments and the problem of the impact on the environment.

In direct production of an aqueous dispersion by polymerization of a hardly water-soluble (meth)acrylate ($a^1$) having a $R^f$ group in an aqueous medium, an organic solvent (such as acetone) which is compatible with a (meth)acrylate ($a^1$) having a $R^f$ group and soluble in water is usually incorporated in the aqueous medium as a polymerization co-solvent. However, if acetone is used as a polymerization co-solvent, there is a problem that the flash point of the aqueous dispersion is low.

As a solution to this problem, use of a polymerization co-solvent with a high flash point which is highly compatible with the polymerizable monomer and soluble in water is proposed (JP-A-5-263070). However, the proposed polymerization co-solvent has a problem that it remains on the treated product because of its high boiling point and increases the affinity of the treated product for water. The problem of inadequate wet abrasion durability of the water and oil repellency is m acknowledged with water and oil repellents obtained by conventional processes.

Besides, water and oil repellents obtained by conventional processes have the problem that the water and oil repellency decreases as the emulsion particles coagulate or precipitate due to co-agents such as an acid or an anionic substance (such as a dye fixative agent or an acid dye) in the treatment bath or contaminants or deterioration in the dispersity of the aqueous dispersion and that the textile is not treated evenly due to adhesion of the polymer to the mangle (gum up). To solve these problems, incorporation of a surfactant containing a nitrogen atom, a polyoxyethylene group and at least five oxyalkylene groups is proposed (JP-A-9-59602 and JP-A-9-118877). However, water and oil repellent aqueous dispersions obtained under this proposal still have the problem of inadequate wet abrasion durability of the water and oil repellency.

An water and oil repellent composition obtained by adding a silicone compound to an emulsion obtained by emulsification of a polymerizable monomer such as a perfuloroalkyl acrylate, water, dipropylene glycol monomethyl ether and polyoxyethylene nonyl phenyl ether under pressure followed by polymerization is also proposed (JP-A-10-245783). However, this composition has a problem that it does not function well without the silicone compound.

Conventional water and oil repellent compositions are inadequate in terms of the property of draining deposited water as rolling waterdrops (hereinafter referred to as the waterdrop rolling property) and have the problem that waterdrops stay on the surface of the treated product.

DISCLOSURE OF THE INVENTION

The present invention solves the above-mentioned problems and provides a process for producing a water and oil repellent aqueous dispersion excellent in the waterdrop rolling property which shows excellent dispersion stability and water and oil repellency even if contaminated with co-agents and contaminants and forms films with an excellent film-forming property, and a water and oil repellent aqueous dispersion produced by the process.

Namely, the present invention provides a process for producing a water and oil repellent aqueous dispersion, comprising emulsifying a stock composition comprising the following polymerizable monomer (A), the following surfactant (B) and the following aqueous medium (C) under pressure and polymerizing the stock composition to form an aqueous dispersion having a polymer (X) comprising polymer units derived from the polymerizable monomer (A) dispersed in the aqueous medium (C):

polymerizable monomer (A): a polymerizable monomer consisting of a (meth)acrylate ($a^1$) having a polyfluoroalkyl group or consisting of a (meth)acrylate ($a^1$) having a polyfluoroalkyl group and a polymerizable monomer ($a^2$) other than the (meth)acrylate ($a^1$) having a polyfluoroalkyl group;

surfactant (B): a surfactant which is a non-fluorine type surfactant containing no aromatic group and contains from 60 to 100 mass % of a nonionic surfactant; and aqueous medium (C): an aqueous medium consisting of water and a solvent having a viscosity of at least 3 cP at 25° C.

BEST MODE FOR CARRYING OUT THE INVENTION

In this specification, acrylic acid and methacrylic acid are generally referred to as (meth)acrylic acid. Similar general names such as (meth)acrylamide also hold.

The polymerizable monomer (A) in the present invention is a polymerizable monomer consisting of a (meth)acrylate ($a^1$) having a $R^f$ group or a polymerizable monomer consisting of a (meth)acrylate ($a^1$) having a $R^f$ group and a polymerizable monomer other than the ($a^1$). The (meth)acrylate ($a^1$) having a $R^f$ group is a compound having a $R^f$ group on the alcohol residue in the (meth)acrylate. The $R^f$ group means an alkyl group having at least two hydrogen atoms substituted by fluorine atoms. The carbon number of the $R^f$ group is preferably from 2 to 20, particularly preferably from 6 to 16.

The $R^f$ group may be linear or branched, preferably linear. When it is branched, it is preferred that the branch is present at the end of the $R^f$ group and is a short chain with a carbon number of from about 1 to 4.

The $R^f$ group may contain a halogen atom other than a fluorine atom. The halogen atom other than the fluorine atom is preferably a chlorine atom. An etheric oxygen atom or a thioetheric sulfur atom may be inserted between a carbon-carbon bond in the $R^f$ group. The structure of the terminus of the $R^f$ group may, for example, —$CF_2CF_3$, —$CF(CF_3)_2$, —$CF_2H$, —$CFH_2$ or —$CF_2Cl$, preferably —$CF_2CF_3$.

The number of the fluorine atoms in the $R^f$ group is preferably at least 60%, particularly preferably at least 80%, when it is represented by [(the number of fluorine atoms in the $R^f$ group)/(the number of hydrogen atoms contained in the corresponding alkyl group having the same carbon number as the $R^f$ group)]×100(%). Further, the $R^f$ group is preferably a group having all hydrogen atoms in an alkyl group substituted by fluorine atoms (i.e. a perfluoroalkyl group), or a group having a terminal perfluoroalkyl group.

The carbon number of the perfluoroalkyl group is preferably from 2 to 20, particularly preferably from 6 to 16. If the carbon number is too small, the water and oil repellency tends to be low. If the carbon number is too large, the (meth)acrylate having a $R^f$ group can be difficult to handle.

Specific examples of the $R^f$ group include the groups given below.

$CF_9$— [which may be any of the structural isomers such as $F(CF_2)_4$—, $(CF_3)_2CFCF_2$—, $(CF_3)_3C$— and $CF_3CF_2(CF_3)CF$—], $C_5F_{11}$— [such as $F(CF_2)_5$—],
$C_6F_{13}$— [such as $F(CF_2)_6$—],
$C_7F_{15}$— [such as $F(CF_2)_7$—],
$C_8F_{17}$— [such as $F(CF_2)_8$—],
$C_9F_{19}$— [such as $F(CF_2)_9$—],
$C_{10}F_{21}$— [such as $F(CF_2)_{10}$—],
$C_{12}F_{25}$— [such as $F(CF_2)_{12}$—],
$C_{14}F_{29}$— [such as $F(CF_2)_{14}$—],
$C_{16}F_{33}$— [such as $F(CF_2)_{16}$—],
$Cl(CF_2)_s$— (wherein s is an integer of from 1 to 20),
$H(CF_2)_t$— (wherein t is an integer of from 1 to 20),
$(CF_3)_2CF(CF_2)_y$— (wherein y is an integer of from 1 to 17), etc.

Specific examples wherein the $R^f$ group is a group having an etheric oxygen atom or a thioetheric sulfur atom inserted between a carbon-carbon bond, include the following groups.

$CF_3(CF_2)_4OCF(CF_3)$—,
$F[CF(CF_3)CF_2O]_rCF(CF_3)CF_2CF_2$—,
$F[CF(CF_3)CF_2O]_zCF(CF_3)$—,
$F[CF(CF_3)CF_2O]_uCF_2CF_2$—,
$F(CF_2CF_2CF_2O)_vCF_2CF_2$—,
$F(CF_2CF_2O)_wCF_2CF_2$—,
$CF_3(CF_2)_4SCF(CF_3)$—,
$F[CF(CF_3)CF_2S]_rCF(CF_3)CF_2CF_2$—,
$F[CF(CF_3)CF_2S]_zCF(CF_3)$—,
$F[CF(CF_3)CF_2S]_uCF_2CF_2$—,
$F(CF_2CF_2CF_2S)_vCF_2CF_2$—,
$F(CF_2CF_2S)_wCF_2CF_2$— (wherein r and z are independently integers of from 1 to 4, u is an integer of from 2 to 6, v is an integer of from 1 to 11, and w is an integer of from 1 to 9), etc.

As the (meth)acrylate having a $R^f$ group, a compound represented by the following formula 1 wherein $R^f$ is a $R^f$ group, Q is a bivalent organic group, and $R^1$ is a hydrogen atom or a methyl group, is preferred.

$$R^f\text{—Q—OCOCR}^1\text{=CH}_2 \qquad \text{formula 1}$$

The $R^f$ group in the formula 1 is preferably a $R^f$ group containing no etheric oxygen atom or no thioetheric sulfur atom, particularly preferably a group represented by $F(CF_2)_n$— (wherein n is an integer of from 1 to 20, preferably an integer of from 4 to 16, particularly preferably an integer of from 6 to 12).

Q in the formula 1 may, for example, be preferably —$(CH_2)_{p+q}$—, —$(CH_2)_pCONR^a(CH_2)_q$—, —$(CH_2)_p$ $OCONR^a(CH_2)_q$—, —$(CH_2)_pSO_2NR^a(CH_2)_q$—, —$(CH_2)_pNHCONH(CH_2)_q$—, —$(CH_2)_pCH(OH)(CH_2)_q$— or —$(CH_2)_pCH(OCOR^a)(CH_2)_q$—, wherein $R^a$ is a hydrogen atom or an alkyl group, and p and q are independently integers of at least 0, provided that p+q is an integer of from 1 to 22.

More preferred is a compound (formula 1) wherein Q is —$(CH_2)_{p+q}$—, —$(CH_2)_pCONR^a(CH_2)_q$— or —$(CH_2)_p$ $SO_2NR^a(CH_2)_q$—, q is an integer of at least 2, and p+q is from 2 to 6. Particularly preferred is a compound (formula 1) wherein Q is —$(CH_2)_{p+q}$— wherein p+q is from 2 to 6 (i.e., an ethylene to hexamethylene group). It is preferred that a fluorine atom is bonded to the carbon atom of $R^f$ bonded to Q.

The following compounds may be mentioned as specific examples of the (meth)acrylate ($a^1$) having a $R^f$ group, wherein $R^1$ is a hydrogen atom or a methyl group.

$F(CF_2)_5CH_2OCOCR^1=CH_2$,
$F(CF_2)_6CH_2CH_2OCOCR^1=CH_2$,
$H(CF_2)_6CH_2OCOCR^1=CH_2$,
$H(CF_2)_{10}CH_2OCOCR^1=CH_2$,
$H(CF_2)_8CH_2CH_2OCOCR^1=CH_2$,
$F(CF_2)_8CH_2CH_2CH_2OCOCR^1=CH_2$,
$F(CF_2)_{10}CH_2CH_2OCOCR^1=CH_2$,
$F(CF_2)_{12}CH_2CH_2OCOCR^1=CH_2$,
$F(CF_2)_{14}CH_2CH_2OCOCR^1=CH_2$,
$F(CF_2)_{16}CH_2CH_2OCOCR^1=CH_2$,
$(CF_3)CF(CF_2)_4CH_2CH_2OCOCR^1=CH_2$,
$(CF_3)CF(CF_2)_6CH_2CH_2OCOCR^1=CH_2$,
$(CF_3)CF(CF_2)_8CH_2CH_2OCOCR^1=CH_2$,
$F(CF_2)_8SO_2N(CH_2CH_2CH_3)CH_2CH_2OCO$—$CR^1=CH_2$,
$F(CF_2)_8(CH_2)_4OCOCR^1=CH_2$,
$F(CF_2)_8SO_2N(CH_3)CH_2CH_2OCOCR^1=CH_2$,
$F(CF_2)_8SO_2N(CH_2CH_3)CH_2CH_2OCOCR^1=CH_2$,
$F(CF_2)_8CONHCH_2CH_2OCOCR^1=CH_2$,
$(CF_3)CF(CF_2)_5(CH_2)_3OCOCR^1=CH_2$,
$(CF_3)CF(CF_2)_5CH_2CH(OCOCH_3)OCO$—$R^1=CH_2$,
$(CF_3)CF(CF_2)_5CH_2CH(OH)CH_2OCO$—$R^1=CH_2$,
$(CF_3)CF(CF_2)_7CH_2CH(OH)CH_2OCO$—$R^1=CH_2$,
$F(CF_2)_9CH_2CH_2OCOCR^1=CH_2$, and
$F(CF_2)_9CONHCH_2CH_2OCOCR^1=CH_2$.

The polymerizable monomer (A) may contain two or more (meth)acrylates ($a^1$) having $R^f$ groups. In this case, they are preferably (meth)acrylates having $R^f$ groups different in the carbon number.

When the polymerizable monomer (A) consists of a (meth)acrylate ($a^1$) having a $R^f$ group and a polymerizable monomer ($a^2$) other than the (meth)acrylate ($a^1$) having a $R^f$ group, as the polymerizable monomer ($a^2$), a know or well known polymerizable monomer, preferably a polymerizable monomer having one or two polymerizable unsaturated groups, particularly preferably a polymerizable monomer having one polymerizable unsaturated group, may be mentioned. It is preferred that the polymerizable monomer ($a^2$) contains the following polymerizable monomer ($a^{21}$) and/or the following polymerizable monomer ($a^{22}$) as essential component(s).

polymerizable monomer ($a^{21}$): an alkyl(meth)acrylate having a $C_{1-20}$ alkyl group or a cycloalkyl(meth) acrylate having a $C_{5-8}$ cycloalkyl group; and polymerizable monomer ($a^{22}$): a vinyl halide or a vinylidene halide.

The alkyl group in the alkyl(meth)acrylate may be linear or branched. A hydrogen group in the alkyl group may be substituted with a cycloalkyl group. As the cycloalkyl(meth) acrylate, cyclohexyl(meth)acrylate is preferred. As the polymerizable monomer ($a^{21}$), preferred is an alkyl(meth) acrylate having a $C_{1-18}$ alkyl group, and particularly preferred is methyl(meth)acrylate, octadecyl(meth)acrylate or 2-ethylhexyl(meth)acrylate.

The vinyl halide is preferably vinyl chloride, vinyl fluoride or chlorotrifluoroethylene. The vinylidene halide is preferably a vinyl halide, vinylidene chloride or vinylidene fluoride.

Further, it is preferred that the polymerizable monomer ($a^2$) contains another polymerizable monomer ($a^{23}$) in addition to the polymerizable monomer ($a^{21}$) and the polymerizable monomer ($a^{22}$).

The polymerizable monomer ($a^{23}$) is preferably a polymerizable monomer selected from monoolefins, vinyl carboxylates, styrene, substituted styrene, (meth) acrylamide, N-substituted (meth)acrylamides, alkyl vinyl ethers, (substituted alkyl) vinyl ethers, vinyl alkyl ketones, diolefins, glycidyl(meth)acrylate, aziridinyl(meth)acrylate, aziridinylalkyl(meth)acrylate, aralkyl(meth)acrylate, hydroxyalkyl(meth)acrylates, polyoxyalkylene mono(meth) acrylates, polyoxyalkylene mono(meth)acrylate monomethyl ethers, polyoxyalkylene di(meth)acrylates, (meth) acrylates having polydimethyl siloxane groups, triallyl cyanurate, allyl glycidyl ether, allyl carboxylates, N-vinylcarbazole, N-methylmaleimide, maleic anhydride, monoalkyl maleate, dialkyl maleate, substituted aminoalkyl (meth)acrylates and (meth)acrylates containing blocked isocyanate groups.

As the polymerizable monomer ($a^{23}$), more preferred is ethylene, vinyl acetate, styrene, α-methylstyrene, p-methylstyrene, (meth)acrylamide, diacetone(meth) acrylamide, methylol diacetone(meth)acrylamide, N,N-dimethyl(meth)acrylamide, N-methylol(meth)acrylamide, an alkyl vinyl ether, a (haloalkyl) vinyl ether, a vinyl alkyl ketone, butadiene, isoprene, chloroprene, glycidyl(meth) acrylate, aziridinyl(meth)acrylate, aziridinylethyl(meth) acrylate, benzyl(meth)acrylate, 2-hydroxyethyl(meth) acrylate, a polyoxyalkylene mono(meth)acrylate, a polyoxyalkylene mono(meth)acrylate monomethyl ether, a polyoxymonoalkylene(meth)acrylate (2-ethylhexyl)ether, a polyoxyalkylene di(meth)acrylate, (meth)acrylate having a polydimethyl siloxane group, triallyl cyanurate, allyl glycidyl ether, allyl acetate, 2-hydroxy-3-chloropropyl(meth) acrylate, N-vinylcarbazole, maleimide, N-methylmaleimide or (2-dimethylamino)ethyl(meth)acrylate.

The (meth)acrylate having a blocked isocyanate group as the polymerizable monomer ($a^{23}$) is preferably a compound obtained by blocking the isocyanate group(s) of an isocyanate-containing (meth)acrylate having at least one isocyanate group with a blocking agent. The isocyanate-containing (meth)acrylate is preferably 2-isocyanatoethyl (meth)acrylate or the product obtained by reacting a (meth) acrylate having a functional group linkable to an isocyanate group and a polyisocyanate in such a ratio that at least one isocyanate group remains.

As the (meth)acrylate having a functional group linkable to an isocyanate group, a (meth)acrylate having a hydroxyl group, particularly a mono- or di-ester of (meth)acrylic acid with a polyhydric alcohol, is preferred. As the polyhydric alcohol, ethylene glycol, polyoxyethylene glycol, propylene glycol, polyoxypropylene glycol, glycerin, trimethylolpropane-alkylene oxide adduct or pentaerythritol may be mentioned.

As the polyisocyanate, an aromatic isocyanate such as 4,4'-diphenylmethane diisocyanate and tolylene diisocyanate, an aliphatic isocyanate such as hexamethylene diisocyanate, isophorone diisocyanate, 4,4'-dicyclohexylmethane diisocyanate, cyclohexylene diisocyanate and norbornene diisocyanate or a modified product of an isocyanate such as an isocyanurate-modified product, a prepolymer-modified product and a biuret-modified product of a polyisocyanate is preferred. Particular preferred is an aliphatic isocyanate or its isocyanurate-, prepolymer- or biuret-modified product.

The blocking agent is preferably an alkyl ketoxime, a phenol, an alcohol, a β-diketone or a lactam. Particularly preferred is methyl ethyl ketoxime, ε-caprolactam, phenol, cresol, acetylacetone, diethyl malonate, isopropyl alcohol, t-butyl alcohol or maleimide. Especially preferred is a compound having a dissociation temperature of from 120 to 180° C.

Specific examples of the (meth)acrylate having a blocked isocyanate group include the following compounds:

2-isocyanatoethyl(meth)acrylate having an isocyanate group blocked with methyl ethyl ketoxime, 2-isocyanatoethyl(meth)acrylate having an isocyanate group blocked with ε-caprolactam, the compound obtained by blocking the isocyanate group of the 1:1 (molar ratio) reaction product of isophorone diisocyanate and 2-hydroxyethyl(meth)acrylate with methyl ethyl ketoxime, the compound obtained by blocking the isocyanate group of the 1:1 (molar ratio) reaction product of isophorone diisocyanate and 2-hydroxypropyl(meth)acrylate with methyl ethyl ketoxime, and the compound obtained by blocking the isocyanate group of the 1:1 (molar ratio) reaction product of norbornene diisocyanate and 2-hydroxyethyl(meth)acrylate with methyl ethyl ketoxime.

With respect to the proportions of the respective polymerization units in the polymer (X), the proportion of polymerization units derived from the (meth)acrylate having a $R^f$ group is preferably from 20 to 99 mass %, and the proportion of polymerization units derived from the polymerizable monomer ($a^2$) is preferably from 1 to 80 mass %. The proportion of polymerization units derived from each of the polymerizable monomer ($a^{21}$) and the polymerizable monomer ($a^{22}$) in the polymer (X), if any, is preferably from 1 to 50 mass %. The proportion of polymerization units derived from the polymerizable monomer ($a^{23}$) in the polymer (X), if any, is preferably from 1 to 50 mass %.

In the present invention, the stock composition comprising the polymerizable monomer (A), a surfactant (B) and an aqueous medium (C) is emulsified under pressure.

The polymerizable monomers in the stock composition are preferred to be solid or liquid under the conditions employed for the emulsification under pressure. Among the above-mentioned polymerizable monomers, the polymerizable monomer ($a^{22}$) is preferably added to the emulsion obtained by emulsifying the stock composition under pressure because it is usually gas under the conditions employed for the emulsification under pressure.

In the present invention, the surfactant (B) is a non-fluorine type surfactant containing no aromatic group which contains from 60 to 100 mass % of a nonionic surfactant. A non-fluorine type surfactant means a surfactant consisting compounds containing no fluorine atom in the structure.

Hereinafter, a "surfactant" means a surfactant containing no fluorine atom and no aromatic group, unless otherwise noted.

The surfactant (B) may consists of one kind of surfactant or at least two kinds of surfactant. When the surfactant (B) consists of at least two kinds, it preferably consists of a nonionic surfactant and a cationic surfactant and/or an amphoteric surfactant.

The stock composition in the present invention preferably contains no surfactant other than the surfactant (B) because the stability of the emulsion obtained emulsification under pressure and the performance of the treated product improve.

The nonionic surfactant in the surfactant (B) is preferably at least one surfactant selected from the following surfactants ($b^1$) to ($b^5$).

The surfactant ($b^1$) is a nonionic surfactant consisting of a polyoxyalkylene monoalkyl ether, a polyoxyalkylene monoalkenyl ether or a polyoxyalkylene monoalkapolyenyl ether. Each of the alkyl groups, the alkenyl groups and the alkapolyenyl groups in the surfactant ($b^1$) preferably has a carbon number of from 4 to 26. Specific examples of the alkyl groups, the alkenyl groups and the alkapolyenyl groups are octyl groups, dodecyl groups, tetradecyl groups, hexadecyl groups, octadecyl groups, hexadecyl groups, behenyl groups (docyocyl groups), oleyl groups (9-octadecenyl groups) and the like.

The surfactant ($b^1$) is preferably a polyoxyalkylene monoalkyl ether or polyoxyalkylene monoalkenyl ether. The polyoxyalkylene moiety in the surfactant ($b^1$) preferably consists of one or two kinds of oxyalkylene groups, and when it consists of two kinds, it is preferred that the each kind of oxyalkylene groups are arranged in blocks. The polyoxyalkylene moiety preferably consists of at least two consecutive oxyethylene groups and/or oxypropylene groups.

As the surfactant ($b^1$), preferred is a compound represented by the following formula 2, wherein $R^2$ is an alkyl group having a carbon number of at least 8 or an alkenyl group having a carbon number of at least 8, s is an integer of from 5 to 50, and g is an integer of from 0 to 20, provided that when both g and s are at least 2, the oxyethylene groups and the oxypropylene groups in formula 2 are arranged in blocks.

$R^2O[CH_2CH(CH_3)O]_g—(CH_2CH_2O)_sH$      formula 2

$R^2$ may be linear or branched. s is preferably an integer of from 10 to 30, and g is preferably an integer of from 0 to 10. If s is 4 or below, or if g is 21 or above, the compound is hardly soluble in water and is unlikely to dissolve uniformly in the aqueous medium (C).

Specific examples of the compound (formula 2) are the following compounds, wherein s and g are the same as defined above and are preferred to be as mentioned above, and the oxyethylene groups and the oxypropylene groups are arranged in blocks

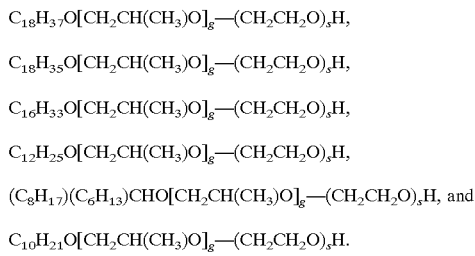

$C_{18}H_{37}O[CH_2CH(CH_3)O]_g—(CH_2CH_2O)_sH$, $C_{18}H_{35}O[CH_2CH(CH_3)O]_g—(CH_2CH_2O)_sH$, $C_{16}H_{33}O[CH_2CH(CH_3)O]_g—(CH_2CH_2O)_sH$, $C_{12}H_{25}O[CH_2CH(CH_3)O]_g—(CH_2CH_2O)_sH$, $(C_8H_{17})(C_6H_{13})CHO[CH_2CH(CH_3)O]_g—(CH_2CH_2O)_sH$, and $C_{10}H_{21}O[CH_2CH(CH_3)O]_g—(CH_2CH_2O)_sH$.

The surfactant ($b^2$) is a nonionic surfactant consisting of a compound which has at least one carbon-carbon triple bond and at least one hydroxyl group in the molecule and shows surface activity, preferably a nonionic surfactant consisting of a compound having one carbon-carbon triple bond and one or two hydroxyl groups in the molecule. The nonionic surfactant may contain a polyoxyalkylene moiety as a partial structure. The polyoxyalkylene moiety may be a polyoxyethylene moiety, a polyoxypropylene moiety, a moiety consisting of oxyethylene groups and oxypropylene groups arranged at random or a moiety consisting of oxyethylene groups and oxypropylene groups arranged in blocks.

Preferred specific examples of the surfactant ($b^2$) are compounds represented by the following formulae 3, 4, 5 or 6.

$HO—CR^3R^4—C\equiv C—CR^5R^6—OH$      formula 3

$HO—(A^1O)_m—CR^3R^4—C\equiv C—CR^5R^6—(OA^2)_n—OH$      formula 4

$HO—CR^7R^8—C\equiv CC—H$      formula 5

$HO—(A^3O)_k—CR^7R^8—C\equiv C—H$      formula 6

In the formulae 3 to 6, each of $A^1$, $A^2$ and $A^3$, which are independent of one another, is an alkylene group, m and n are independently integers of at least 0, (m+n) is an integer of at least 1, and k is an integer of at least 1, provided that when m, n or k is at least 2, each of $A^1$, $A^2$ and $A^3$ may consist of one kind of alkylene groups or two kinds of alkylene groups.

Each of $R^3$, $R^4$, $R^5$, $R^6$, $R^7$ and $R^8$, which are independent of one another, is a hydrogen atom or an alkyl group, preferably a $C_{1-12}$ alkyl group, particularly preferably a $C_{6-12}$ alkyl group. Specific examples of these groups are a methyl group, an ethyl group, a propyl group, a butyl group and an isobutyl group.

As the oxyalkylene moiety, an oxyethylene moiety, an oxypropylene moiety or a moiety consisting of both an oxyethylene moiety and an oxypropylene moiety is preferable. The number of oxyalkylene moieties in the surfactant ($b^2$) is preferably from 1 to 50.

As the surfactant ($b^2$), preferred is a nonionic surfactant represented by the following formula 7, wherein x and y are integers of at least 0.

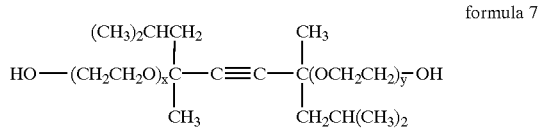

formula 7

As the nonionic surfactant (formula 7), a nonionic surfactant wherein the average sum of x and y is 10, a nonionic surfactant wherein x is 0, and y is 0, or a nonionic surfactant wherein the average sum of x and y is 1.3 is preferred.

The surfactant ($b^3$) is a nonionic surfactant consisting of a compound which has a polyoxyethylene moiety consisting of at least two consecutive oxyethylene groups and a moiety consisting of at least two consecutive oxyalkylene groups having a carbon number of at least 3 and has hydroxyl groups at both ends. The oxyalkylene having a carbon number of at least 3 is preferably oxytetramethylene and/or oxypropylene.

As the surfactant ($b^3$), preferred is a nonionic surfactant consisting of a compound represented by the following formula 8 or 9, wherein h is an integer of 0 to 200, r is an integer of from 2 to 100, t is an integer of from 0 to 200, and (h+t) is an integer of at least 2. The —$C_3H_6$— moiety in the following formulae may be —$CH(CH_3)CH_2$—, —$CH_2CH(CH_3)$— or a mixture of —$CH(CH_3)CH_2$— and —$CH_2CH(CH_3)$—, and the polyoxyalkylene moieties in the following formulae form blocks.

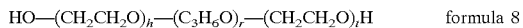  formula 8

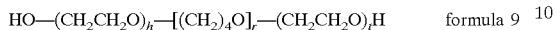  formula 9

As the surfactant ($b^3$), further preferred is a nonionic surfactant which is any of the following compounds.

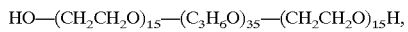

The surfactant ($b^4$) is a nonionic surfactant having an amine oxide moiety in the molecule, preferably a nonionic surfactant which is a compound represented by the following formula 10.

$(R^9)(R^{10})(R^{11})N(\rightarrow O)$  formula 10

In formula 10, each of $R^9$, $R^{10}$ and $R^{11}$, which are independent of one another, is a monovalent hydrocarbon group. In the present invention, a surfactant having an amine oxide moiety (N→O) is considered as a nonionic surfactant though it sometimes classified as a cationic surfactant.

As the surfactant ($b^4$), particularly preferred is a nonionic surfactant represented by the following formula 11, because the stability of the dispersion of the polymer (X) improves.

$(R^{12})(CH_3)_2N(\rightarrow O)$  formula 11

In formula 11, $R^{12}$ is a $C_{6-22}$ alkyl group, a $C_{6-22}$ alkenyl group, a phenyl group linked to a ($C_{6-22}$)alkyl group or a phenyl group linked to a ($C_{6-22}$)alkenyl group, preferably a $C_{8-22}$ alkyl group. Specific examples of the nonionic surfactant (formula 11) include the following compounds.

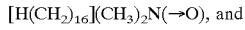

The surfactant ($b^5$) is a nonionic surfactant consisting of a fatty acid ester of a polyol. As the polyol for the surfactant ($b^5$), polyethylene glycol, decaglycerin, the ether of polyethylene glycol or a polyol (other than polyethylene glycol) may be mentioned.

As the surfactant ($b^5$), the 1:1 (molar ratio) ester of octadenanoic acid with polyethylene glycol, the 1:4 (molar ratio) ester of the ether of sorbit and polyethylene glycol with oleic acid, the 1:1 (molar ratio) ester of the ether of polyoxyethylene glycol and sorbitan with octadecanoic acid, the 1:1 (molar ratio) ester of the ether of polyethylene glycol and sorbitan with oleic acid, the 1:1 (molar ratio) ester of dodecanoic acid with sorbitan, the (1 or 2):1 (molar ratio) ester of oleic acid with decaglycerin or the (1 or 2):1 (molar ratio) ester of octadecanoic acid with decaglycerin may be mentioned.

As the cationic surfactant, preferred is a cationic surfactant which is a substituted ammonium salt, particularly a cationic surfactant which is a compound represented by the following formula 12.

$[(R^{13})_4N^+].X^-$  formula 12

The symbols in formula 12 have the following meanings.

$R^{13}$: each of the four $R^{13}$s, which are independent of one another, is a hydrogen atom, a $C_{1-22}$ alkyl group, a $C_{2-22}$ alkenyl group or a polyoxyalkylene group having a terminal hydroxyl group, provided that all the four $R^{13}$s are not hydrogen atoms simultaneously; and $X^-$: a counterion.

The alkyl group as $R^{13}$ is preferably a long chain $C_{6-22}$ alkyl group. The alkenyl group as $R^{13}$ is preferably a long chain $C_{6-22}$ alkenyl group. The polyoxyalkylene group as $R^{13}$ is preferably a polyoxyethylene group. It is preferred that $R^{13}$s essentially include a methyl group or an ethyl group in addition to long chain groups. As $X^-$, a chloride ion, an ethylsulfate ion or an acetate ion is preferred.

As the compound (formula 12), a mono(long chain alkylamine) hydrochloride, a mono(long chain alkyl) dimethylamine hydrochloride, a mono(long chain alkyl) dimethylamine acetate, a mono(long chain alkenyl) dimethylamine hydrochloride, a mono(long chain alkyl) dimethylamine ethylsulfate, a mono(long chain alkyl) trimethylammonium chloride, a di(long chain alkyl) monomethylamine hydrochloride, a di(long chain alkyl) dimethylammonium chloride, a mono(long chain alkyl) monomethyldi(polyoxyethylene)ammonium chloride or a di(long chain alkyl)monomethylmono(polyoxyethylene) ammonium chloride may be mentioned.

As the compound (formula 12), preferred is monooctadecyltrimethylammonium chloride, monooctadecyldimethylmonoethylammonium ethylsulfate, mono(long chain alkyl)monomethyldi(polyethylene glycol)ammonium chloride, di(tallow alkyly)dimethylammonium chloride or dimethylmonococonutamine acetate.

When the surfactant (B) contains an amphoteric surfactant, the amphoteric surfactant is preferably an alanine, an aliphatic amide betaine, acetic acid betaine or the like. Specific examples of the amphoteric surfactant include dodecylbetaine, octadecylbetaine, dodecyldimethylaminoacetic acid betaine and a fatty acid amide propyldimethylaminoacetic acid betaine.

The amount of the surfactant (B) is preferably from 1 to 10 mass %, particularly from 3 to 10 mass %, based on the polymerizable monomer (A). If the amount of the surfactant (B) is too small, the stability of the emulsion tends to be poor, while if it is too large, the wet abrasion durability of the water and oil repellency of the aqueous dispersion may be possibly poor. However, when the polymerizable monomer (A) in the stock composition contains a polymerizable monomer having self-emulsibility, the amount of the surfactant (B) can be reduced.

The aqueous medium (C) is an aqueous medium consisting of water and a solvent having a viscosity of at least 3 cP at 25° C. The viscosity is preferably from 3 to 200 cP, in particular from 5 to 120 cP. The viscosity is a physical index that indicates the flowability of a fluid. In the present invention, the use of the aqueous medium (C) containing a solvent having a specific or higher level of the physical index in the specific polymerization procedure enables production of a water and oil repellent aqueous dispersion having excellent performance as well as a high viscosity.

The solvent in the aqueous medium (C) is supposed to act mainly as a co-solvent during polymerization or emulsification and interact with the surfactant (B) to improve the stability of the emulsion obtained by emulsification under pressure. The solvent has the advantage that the stability and homogeneity of the emulsion lasts long during the emulsification under pressure.

The solvent in the aqueous medium (C) is preferably at least one solvent selected from saturated polyhydric alcohols, (mono or poly)alkyl ethers of saturated polyhydric alcohols and alkylene oxide adducts of saturated polyhydric alcohols.

Preferable saturated polyhydric alcohols are ethylene glycol, propylene glycol, glycerin, trimethylolethane and trimethylolpropane.

Preferable (mono or poly)alkyl ethers of saturated polyhydric alcohols are diethylene glycol monomethyl ether, dipropylene glycol monomethyl ether, dipropylene glycol dimethyl ether, particularly diethylene glycol monomethyl ether and dipropylene glycol monomethyl ether.

Preferable reaction products of polyhydric alcohols and ethylene oxide and/or propylene oxide are dipropylene glycol, tripropylene glycol, tetrapropylene glycol and polypropylene glycol having at least five consecutive oxypropylene groups.

The solvent in the aqueous medium (C) is preferably at least one solvent selected from ethylene glycol, propylene glycol, diethylene glycol, triethylene glycol, tetraethylene glycol, diethylene glycol monomethyl ether, dipropylene glycol monomethyl ether, tripropylene glycol monomethyl ether, glycerin, dipropylene glycol, tripropylene glycol, tetrapropylene glycol and polypropylene glycol.

The amount of the solvent in the aqueous medium (C) is preferably from 2 to 50 mass %, particularly from 10 to 40 mass %, based on the polymerizable monomer (A). If the amount of the solvent is too small, the effect of improving the stability of the emulsion may not be acknowledged, while if the amount of the solvent is too large, the waterdrop rolling property may be poor. The amount of the aqueous medium (C) is preferably 1 to 5 times by mass as that of the polymerizable monomer (A).

In the present invention, the stock composition comprising the polymerizable monomer (A), the aqueous medium (C) and the surfactant (B) is emulsified under pressure. It is possible to incorporate components other than the aqueous medium (C) and the surfactant (B) (hereinafter referred to other components) into the stock composition. As the other components, a chain transfer agent, a pH adjustor and the like may be mentioned. In the present invention, it is preferred to add a chain transfer agent, and as the chain transfer agent, a compound represented by the following formula 13 (wherein $R^{14}$ is a $C_{12-18}$ alkyl group) is preferably added to improve various properties of the composition of the present invention. The amount of the chain transfer agent can be varied appropriately in accordance with the molecular weight of the polymer (X).

$$R^{14}SH \qquad \text{formula 13}$$

The stock composition may be pre-emulsified, for example, by stirring before it is emulsified under pressure, though it is not essential. The emulsification under pressure is preferably performed in a high pressure emulsifier. As the high pressure emulsifier, Manton-Gaulin, Hydroshear or Microfluidizer may be mentioned. Emulsification of the stock composition under pressure gives an emulsion of the polymerizable monomer (A). The gauge pressure during the emulsification is preferably from 1 MPa to 50 MPa (MPa denotes megapascal). The temperature of the stock composition under pressure is preferably from 40 to 80° C. Though the emulsification under pressure can be accomplished by just keeping the stock composition under pressure, it may be stirred, if necessary.

The emulsion obtained after the emulsification under pressure has the advantage that the polymerizable monomer in it forms thermodynamically stable particles with a small average particle diameter that allow most of the polymerizable monomer to react efficiently during polymerization. The average diameter of the particles in the emulsion after the emulsification under pressure is preferably from $1 \times 10^{-4}$ to $3 \times 10^{-1}$ μm.

In the present invention, the stock composition is polymerized by emulsion polymerization after the emulsification under pressure. The emulsion polymerization is preferably initiated by adding a polymerization initiator to the stock composition after the emulsification under pressure. The polymerization initiator is not particularly limited and may be a common polymerization initiator such as an organic peroxide, an azo compound or a persulfate or an ionization radiation such as γ rays. The reaction temperature during the polymerization reaction can be varied in accordance with the radical initiator to be used and is preferably from 30 to 80° C. The reaction time is preferably from 4 to 70 hours.

When the polymer (X) in the present invention contains polymerization units derived from the polymerizable monomer ($a^{22}$) which is gas under the conditions employed for the emulsification under pressure, it is preferred to add the polymerizable monomer ($a^{22}$) the stock composition after the emulsification under pressure prior to polymerization.

The aqueous dispersion obtained by the polymerization reaction may be used as the water and oil repellent aqueous dispersion by itself or may be diluted with water and/or an organic solvent, preferably with water alone. The aqueous dispersion obtained by the process of the present invention has the advantage that its high stability lasts even in the presence of contaminants. The organic solvent to be used to dilute it may be the same as or different from the one contained in the aqueous medium (C).

The process of the present invention affords an aqueous dispersion having the polymer (X) in the aqueous medium (C). It is preferred that the polymer (X) is dispersed in the aqueous medium (C) in the form of particles of from 0.03 to 0.25 μm in size.

The aqueous dispersion of the present invention is useful as a water and oil repellent aqueous dispersion having excellent water and oil repellency. The aqueous dispersion is diluted to an arbitrary concentration depending on the purpose or application and then applied to an object. As a method for applying it to an object, an optional method is employed depending upon the type of the object to be treated or the formulation of the composition. For example, there is a method wherein it is put on the surface of an object to be treated by a coating method such as dipping and then dried. Further, if necessary, it is possible to apply it together with a suitable crosslinking agent and then cure them.

The water and oil repellent aqueous dispersion of the present invention shows excellent stability and long lasting water and oil repellency, even used in combination with another compound, and therefore may be used, if necessary, in combination with additives such as another polymer blender, another water repellent, another oil repellent, an insecticide, a flame retardant, an antistatic agent, a dye stabilizer and an anticrease agent.

The object to be treated with the water and oil repellent of the present invention is not particularly limited, and may be a textile (fabric), glass, paper, leather, fur, asbestos, brick, cement, metals and metal oxides, ceramics, plastic, preferably a textile.

Textiles made of animal or plant natural fibers such as cotton, hemp, wool or silk, synthetic fibers such as polyamide, polyester, polyvinyl alcohol, polyacrylonitrile, polyvinyl chloride or polypropylene, semisynthetic fibers such as rayon or acetate, inorganic fibers such as glass fibers or carbon fibers, or mixed fibers thereof may be mentioned.

The aqueous dispersion obtained by the process of the present invention is a water and oil repellent aqueous dispersion which is more excellent in durability against washing and dry cleaning, the waterdrop rolling property and water and oil repellency than conventional water and oil repellents. The aqueous dispersion of the present invention is advantageous also in view of the working environment.

It is not completely clear why the water and oil repellent aqueous dispersion of the present invention shows excellent stability and how it imparts an excellent waterdrop rolling property to the treated textile. However, it is supposed that the use of the highly viscous solvent and the specific surfactant allows formation of a homogeneous emulsion with prominent stability by emulsification under pressure which yields an aqueous dispersion with excellent stability containing the polymer (x) of high quality upon polymerization.

The water and oil repellent aqueous dispersion of the present invention is excellent in the film-forming property and is able to form films having an excellent waterdrop rolling property. The water and oil repellent aqueous dispersion is excellently stable even in the presence of co-agents and contaminants and during stirring and storage. The water and oil repellent aqueous dispersion imparts excellent water and oil repellency and an excellent waterdrop rolling property to textiles and the like.

EXAMPLES

The present invention will be described specifically with reference to Working Examples (Examples 1 to 6) and Comparative Examples (Examples 7 to 9). The codes used in the Examples denote the following meanings.

FA: a mixture of $F(CF_2)_nCH_2CH_2OCOCH=CH_2$, wherein n is from 6 to 16 and averages 9;

StA: octadecyl acrylate;

CHMA: cyclohexyl methacrylate;

NMAA: N-methylolacrylamide;

VCL: vinyl chloride;

CHPMA: 3-chloro-2-hydroxypropyl methacrylate;

GMA: glycidyl methacrylate:

DOM: dioctyl malate;

HE6P: the reaction product of the compound obtained by blocking one of the isocyanate groups of isophorone diisocyanate with methyl ethyl ketoxime and 2-hydroxyethyl methacrylate;

PEOOE: polyoxyethylene monooleyl ether;

StTMAC: trimethylmonooctadecylammonium chloride;

POEL: polyoxyethylene mono(2-dodecyl)ether containing 15 oxyethylene units;

PEOPPO: polyoxyethylene polyoxypropylene block polymer (formula 8 wherein h and t are 15, and r is 35);

DTDMAC: di(tallow alkyl)dimethylammonium chloride;

LDMAO: monolauryldimethylamine oxide;

PEOOPE: polyoxyethylene mono(octylphenyl)ether;

Surfactant $C^1$: compound of formula 7 wherein the sum of x and y is 10;

PEOLE: polyoxyethylene(1-methylundecyl ether);

DPG: dipropylene glycol (viscosity 107 cP at 25° C.);

TPG: tripropylene glycol (viscosity 56 cP at 25° C.);

TEPG: tetrapropylene glycol (viscosity 50 cP at 25° C.);

PPG: solvent mixture of 70 mass % of tripropylene glycol, 25 mass % of tetrapropylene-glycol and 5 mass % of polypropylene glycol (viscosity 52 cP at 25° C.);

DPGMME: dipropylene glycol monomethyl ether (viscosity 3.3 cP at 25° C.);

ACE: acetone (viscosity 0.3 cP at 25° C.); and

StSH: octadecylmercaptan.

Example 1

FA (154 g), StA (90 g), CHMA (12.8 g), StSH (0.77 g), PEOOE (15.4 g), StTMAC (5.1 g), DPG (290 g) and deionized water (320 g) were stirred at 50° C. for 30 minutes and then emulsified in a high pressure emulsifier (Manton-Gaulin) at 20 MPa while maintained at 40 to 50° C. The average particle diameter of the resulting emulsion was 0.23 μm.

Then, it was transferred into a 1 l glass autoclave, and azobis(2-amidinopropane)dihydrochloride (0.5 g) was added. The atmosphere in the autoclave was replaced with nitrogen, and polymerization was carried out at an elevated temperature of 60° C. for 6 hours with stirring to give a milky emulsion. The average molecular weight of the polymer in the emulsion was 98,000. The solid content of the emulsion was 37.6 mass %, and the average particle diameter of the polymer was 0.11 μm. The emulsion was diluted with deionized water to a solid content of 20 mass %, to obtain stock solution 1.

Example 2

FA (167 g), StA (46.2 g), NMAA (5.1 g), StSH (0.77 g), PEOOE (10.3 g), surfactant $C^1$ (5.1 g), PEOLE (5.1 g), TPG (90 g) and deionized water (320 g) were stirred at 50° C. for 30 minutes and then emulsified in a high pressure emulsifier (Manton-Gaulin) at 30 MPa while maintained at 40 to 50° C. The average particle diameter of the resulting emulsion was 0.17 μm.

Then, it was transferred into a 1 l glass autoclave, and azobis(2-amidinopropane)dihydrochloride (0.5 g) was added. The atmosphere in the autoclave was replaced with nitrogen, and after addition of VCL (38.5 g), polymerization was carried out at an elevated temperature of 60° C. for 15 hours with stirring to give a milky emulsion. The average molecular weight of the polymer in the emulsion was 80,000. The solid content of the emulsion was 38.1 mass %, and the average particle diameter of the polymer was 0.07 μm. The emulsion was diluted with deionized water to a solid content of 20 mass %, to obtain stock solution 2.

Examples 3 to 8

Polymerization was carried out by using the polymerizable monomers, solvents and surfactants shown in Table 1, by the procedure of Example 1 in Examples 4, 6 and 8 and by the procedure of Example 2 in Examples 3, 5 and 7 to give emulsions, and the emulsions were diluted to obtain stock solutions 3 to 8.

Example 9

Polymerization was carried out by following the procedure of Example 1 except that the emulsification in the high pressure emulsifier in Example was omitted. After the polymerization, a large amount of solid was precipitated in the autoclave, and no emulsion containing the polymer of the loaded polymerizable monomer was formed.

TABLE 1

| Stock solution | Polymerizable monomer (parts by mass) | Medium (B) (parts by mass) | Surfactant (C) (parts by mass) |
|---|---|---|---|
| Ex. 1 | FA/StA/CHMA (65/35/5) | DPG(35) | PEOOE(6) StTMAC(2) |
| Ex. 2 | FA/StA/NMAA/VCL (65/18/2/15) | TPG(35) | PEOOE(4) Surfactant C¹(2) POEL(2) |
| Ex. 3 | FA/CHPMA/NMMA/VCL (72/5/3/20) | DPGMME(35) | PEOOE(6) PEOPPO(1) |
| Ex. 4 | FA/StA/CHMA/GMA/ NMMA/CHPMA (60/13/20/3/2/2) | DPG(35) | PEOOE(6) PEOPPO(1) DTDMAC(1) |
| Ex. 5 | FA/DOM/NMAA/VCL (70/6.5/2.5/21) | TEPG(35) | PEOOE(6) PEOPPO(1) |
| Ex. 6 | FA/StA/HE6P (60/38/2) | PPG(35) | POEL(4) Surfactant C¹(2) StTMAC(1.6) |
| Ex. 7 | FA/DOM/NMAA/VCL (70/6.5/2.5/21) | TPG(35) | LDMAO(1.5) PEOOPE(2.5) StTMAC(4) |
| Ex. 8 | FA/StA/HE6P (60/38/2) | ACE(65) | PEOOE(6) PEOPPO(1) |

Application to Fabric

Stock solutions 1 to 8 obtained as described above were respectively diluted with deionized water to a solid content of 0.5 mass % to prepare treating solutions. A polyester tropical cloth as a test cloth was dipped in each treating solution and squeezed between a pair of rubber rollers to a wet pick up of 60 mass %. Then, it was dried at 110° C. for 90 seconds and heat-treated at 170° C. for 60 seconds. With respect to the test cloths after the treatment, the water repellency, the oil repellency and the waterdrop rolling angle were measured by the following methods. The results are shown in Table 4.

Water and Oil Repellency in the Presence of Contaminants

Stock solutions 1 to 8 obtained as described above were respectively diluted with deionized water to a solid content of 0.5 mass, and 0.005 mass % of a disperse dye (Sumikaron Red) was added to obtain treating solutions. A polyester tropical cloth as a test cloth was dipped in each treating solution and squeezed between a pair of rubber rollers to a wet pick up of 60 mass %. Then, it was dried at 110° C. for 90 seconds and heat-treated at 170° C. for 60 seconds. With respect to the test cloths after the treatment, the water repellency and the oil repellency were measured by the following methods. The results are shown in Table 4.

Evaluation of Water Repellency

The evaluation was carried out by a spray test of JIS-L 1092 and represented by the water repellency numbers shown in Table 2.

TABLE 2

| Water repellency number | State |
|---|---|
| 100 | No wetting observed on the surface |

TABLE 2-continued

| Water repellency number | State |
|---|---|
| 90 | Slight wetting observed on the surface |
| 80 | Partial wetting observed on the surface |
| 70 | Substantial wetting observed on the surface |
| 50 | Wetting observed over the entire surface |
| 0 | Complete wetting observed over both surfaces |

Evaluation of Oil Repellency

The evaluation was carried out in accordance with AATCC-TM118-1966 and represented by the oil repellency numbers as shown in Table 3.

TABLE 3

| Oil repellency number | Test liquid | Surface tension (25° C.) × 10⁵ N/cm |
|---|---|---|
| 8 | n-Heptane | 20.0 |
| 7 | n-Octane | 21.8 |
| 6 | n-Decane | 23.5 |
| 5 | n-Dodecane | 25.0 |
| 4 | n-Tetradecane | 26.7 |
| 3 | n-Hexadecane | 27.3 |
| 2 | 65 Parts of nujol/35 parts of n-hexadecane | 29.6 |
| 1 | Nujol | 31.2 |
| 0 | Less than 1 | — |

Evaluation of Waterdrop Rolling Property

50 μl of water was dropped onto a test cloth to form a waterdrop on the surface of the test cloth. It was allowed to stand still for a minute, and the cloth was inclined at a rate of 5 degree per minute. The angle between the test cloth and the horizontal plane at which the waterdrop started to roll was defined as the waterdrop rolling angle (unit: degree). The smaller the waterdrop rolling angle is, the better the waterdrop rolling property is.

TABLE 4

| Stock solution | Water repellency | Oil repellency | Waterdrop rolling angle | In the presence of contaminants | |
|---|---|---|---|---|---|
| | | | | Water repellency | Oil repellency |
| Ex. 1 | 100 | 6 | 5.5 | 100 | 6 |
| Ex. 2 | 100 | 6 | 5.3 | 100 | 6 |
| Ex. 3 | 100 | 5 | 6.5 | 100 | 5 |
| Ex. 4 | 100 | 6 | 4.5 | 100 | 6 |
| Ex. 5 | 100 | 5 | 5.8 | 100 | 5 |
| Ex. 6 | 100 | 6 | 4.5 | 100 | 6 |
| Ex. 7 | 90+ | 3 | 22.5 | Precipitation | Precipitation |
| Ex. 8 | 80+ | 4 | 19.5 | 80 | 1 |

What is claimed is:
1. A process for producing a water and oil repellent aqueous dispersion, comprising emulsifying a stock composition comprising the following polymerizable monomer (A), the following surfactant (B) and the following aqueous medium (C) under pressure and polymerizing the stock composition to form an aqueous dispersion having a polymer (X) comprising polymer units derived from the polymerizable monomer (A) dispersed in the aqueous medium (C):

polymerizable monomer (A): a polymerizable monomer consisting of a (meth)acrylate ($a^1$) having a polyfluoroalkyl group or consisting of a (meth)acrylate ($a^1$) having a polyfluoroalkyl group and a polymerizable monomer ($a^2$) other than the (meth)acrylate ($a^1$) having a polyfluoroalkyl group;

surfactant (B): a surfactant which is a non-fluorine type surfactant containing no aromatic group and contains from 60 to 100 mass % of a nonionic surfactant; and aqueous medium (C): an aqueous medium consisting of water and a solvent having a viscosity of at least 3 cP at 25° C.

2. The process according to claim 1, wherein the polymerizable monomer ($a^2$) is a polymerizable monomer containing an alkyl(meth)acrylate having a $C_{1-20}$ alkyl group.

3. The process according to claim 1, wherein the amount of the solvent in the aqueous medium (C) is from 2 to 50 mass % based on the polymerizable monomer (A).

4. The process according to claim 1, wherein the stock composition contains no surfactant other than the surfactant (B).

5. The process according to claim 1, wherein the nonionic surfactant in the surfactant (B) is at least one nonionic surfactant selected from the following surfactants ($b^1$) to ($b^5$):

surfactant ($b^1$): a nonionic surfactant consisting of a polyoxyalkylene monoalkyl ether, a polyoxyalkylene monoalkenyl ether or a polyoxyalkylene monoalkapolyenyl ether;

surfactant ($b^2$): a nonionic surfactant consisting of a compound which has at least one carbon-carbon triple bond and at least one hydroxyl group in the molecule and shows surface activity;

surfactant ($b^3$): a nonionic surfactant consisting of a compound which has a polyoxyethylene moiety consisting of at least two consecutive oxyethylene groups and a moiety consisting of at least two consecutive oxyalkylene groups having a carbon number of at least 3 and has hydroxyl groups at both ends;

surfactant ($b^4$): a nonionic surfactant having an amine oxide moiety in the molecule; and surfactant ($b^5$): a nonionic surfactant consisting of a fatty acid ester of a polyol.

6. The process according to claim 1, wherein the amount of the surfactant (B) is from 1 to 10 mass % based on the polymerizable monomer (A).

7. The process according to claim 1, wherein the following polymerizable monomer ($a^{22}$) is added after the emulsification under pssure, and the polymerization is carried out:

polymerizable monomer ($a^{22}$): a vinyl halide or vinylidene halide.

8. The process according to claim 1, wherein the stock composition further comprises a compound represented by the following formula 13:

$$R^{14}-SH \qquad \text{formula 13}$$

wherein $R^{14}$ is a $C_{12-18}$ alkyl group.

9. The process according to claim 1, wherein the average particle diameter of the polymer (X) is from 0.03 to 0.25 µm.

10. The process according to claim 1, wherein said solvent in said aqueous medium comprises at least one solvent selected from the group consisting of a saturated polyhydric alcohol, an alkyl ether of a polyhydric alcohol, and an alkylene oxide adduct of a saturated polyhydric alcohol.

11. The process according to claim 10, wherein the solvent in the aqueous medium (C) is at least one solvent selected from the group consisting of ethylene glycol, propylene glycol, diethylene glycol, triethylene glycol, tetraethylene glycol, diethylene glycol monomethyl ether, dipropylene-glycol monomethyl ether, tripropylene glycol monomethyl ether, glycerin, dipropylene glycol, tripropylene glycol, tetrapropylene glycol and polypropylene glycol.

12. A water and oil repellent aqueous dispersion produced by the process according to claim 1.

13. An object treated with the water and oil repellent aqueous dispersion according to claim 12.

14. The water and oil repellent aqueous dispersion of claim 12, wherein said surfactant is in an amount of 1 to 10 mass % based on the polymerizable monomer (A).

15. The water and oil repellent aqueous dispersion of claim 12, wherein said solvent has a viscosity of from 3 to 200 cP at 25° C.

16. The water and oil repellent aqueous dispersion of claim 12, wherein said solvent has a viscosity of from 5 to 120 cP at 25° C.

17. The water and oil repellent aqueous dispersion of claim 12, wherein said (meth)acrylate ($a^1$) is a compound of the following formula:

$$F(CF_2)_nCH_2CH_2OCOCH=CH_2$$

wherein n is an integer from 6 to 16.

18. The water and oil repellent aqueous dispersion of claim 12, wherein said polymerizable monomer ($a^2$) is at least one monomer selected from the group consisting of octadecyl acrylate, cyclohexyl methacrylate, N-methylolacrylamide, vinyl chloride, 3-chloro-2-hydroxypropyl methacrylate, glycidyl methacrylate, dioctyl malate, and a monomer obtainable by reaction of a compound obtained by blocking one isocyanate group of isophorone diisocyanate with methyl ethyl ketoxime, and 2-hydroxyethyl methacrylate.

19. The water and oil repellent aqueous dispersion of claim 12, wherein said solvent is selected from the group consisting of dipropylene glycol, tripropylene glycol, tetrapropylene glycol, dipropylene glycol monomethyl ether, and a mixture of 70 mass % tripropylene glycol, 25 mass % tetrapropylene glycol, and 5 mass % polypropylene glycol.

20. The water and oil repellent aqueous dispersion of claim 12, wherein said nonionic surfactant is at least one surfactant selected from the group consisting of surfactants ($b^1$) to ($b^5$):

surfactant ($b^1$): a nonionic surfactant consisting of a polyoxyalkylene monoalkyl ether, a polyalylene monoalkenyl ether or a polyoxyalkylene monoalkapolyenyl ether;

surfactant ($b^2$): a nonionic surfactant consisting of a compound which has at least one carbon-carbon triple bond and at least one hydroxyl group in the molecule and shows surface activity;

surfactant ($b^3$): a nonionic surfactant consisting of a compound which has a polyoxymethylene moiety consisting of at least two consecutive oxyalkylene groups having a carbon number of at least 3 and has hydroxyl groups at both ends;

surfactant ($b^4$): a nonionic surfactant having an amine oxide moiety in the molecule; and surfactant ($b^5$): a nonionic surfactant consisting of a fatty acid ester of a polyol.

* * * * *